Figure 1:
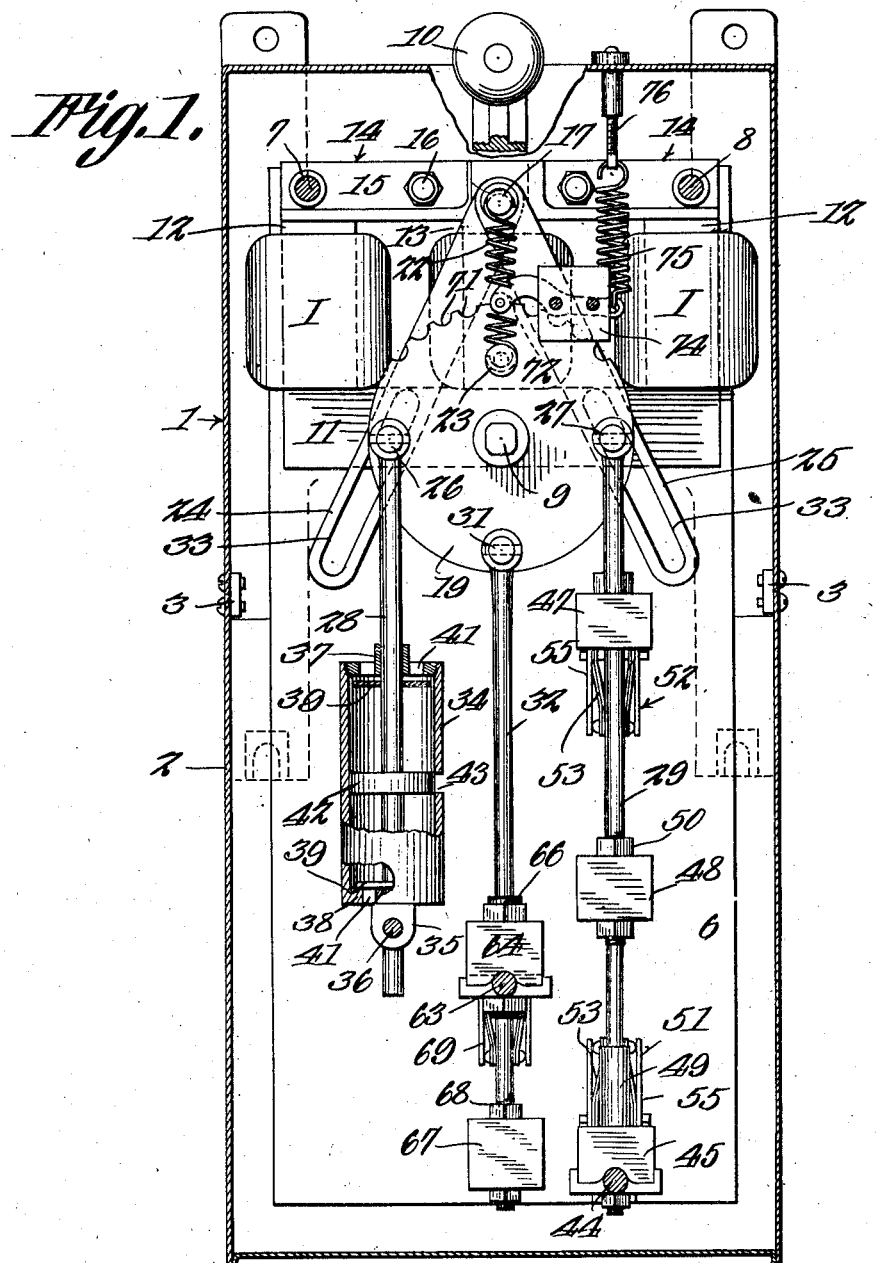

C. REDFIELD.
CONTROLLING DEVICE FOR VARIABLE SPEED ELECTRIC MOTORS.
APPLICATION FILED JULY 7, 1915.

1,175,177.

Patented Mar. 14, 1916.
4 SHEETS—SHEET 1.

WITNESSES:
F. B. Wooden.
H. T. Chapman.

Cleveland Redfield INVENTOR

BY

Attorney

C. REDFIELD.
CONTROLLING DEVICE FOR VARIABLE SPEED ELECTRIC MOTORS.
APPLICATION FILED JULY 7, 1915.

1,175,177.

Patented Mar. 14, 1916.
4 SHEETS—SHEET 3.

WITNESSES:
F. B. Wooden.
F. T. Chapman.

Cleveland Redfield
INVENTOR

BY

Attorney

C. REDFIELD.
CONTROLLING DEVICE FOR VARIABLE SPEED ELECTRIC MOTORS.
APPLICATION FILED JULY 7, 1915.
1,175,177.
Patented Mar. 14, 1916.
4 SHEETS—SHEET 4.
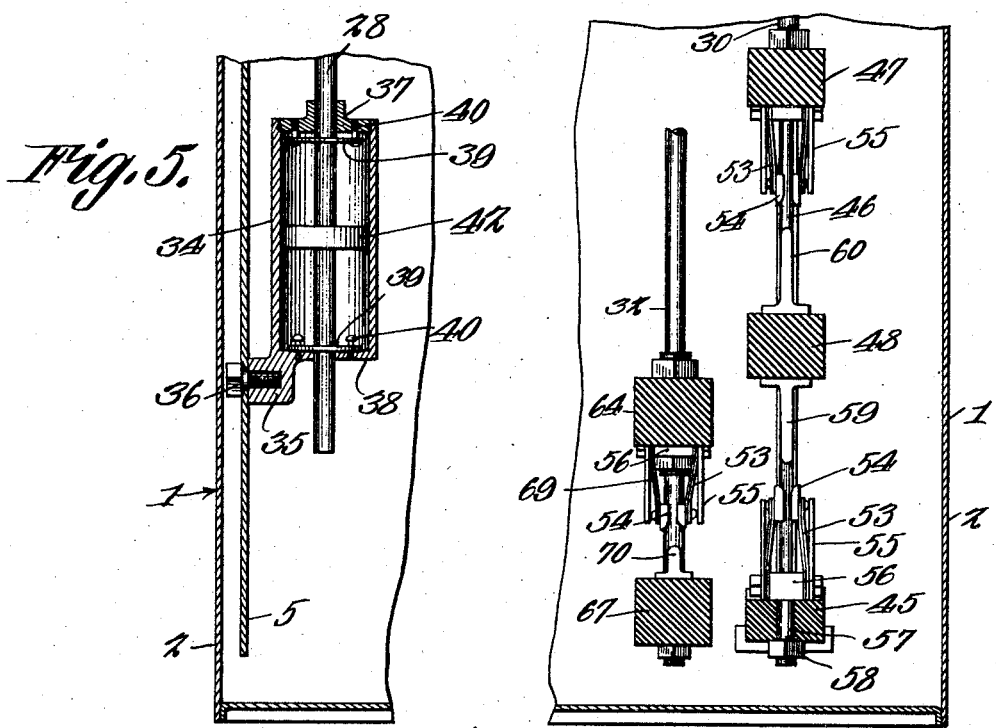
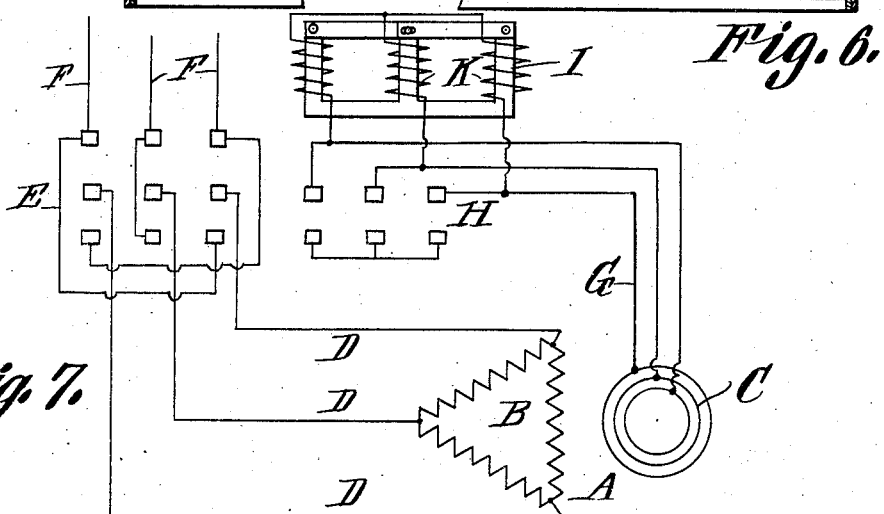
Cleveland Redfield
INVENTOR
WITNESSES:
BY
Attorney

UNITED STATES PATENT OFFICE.

CLEVELAND REDFIELD, OF OGDEN, UTAH.

CONTROLLING DEVICE FOR VARIABLE-SPEED ELECTRIC MOTORS.

1,175,177. Specification of Letters Patent. Patented Mar. 14, 1916.

Application filed July 7, 1915. Serial No. 38,519.

*To all whom it may concern:*

Be it known that I, CLEVELAND REDFIELD, a citizen of the United States, residing at Ogden, in the county of Weber and State of Utah, have invented a new and useful Controlling Device for Variable-Speed Electric Motors, of which the following is a specification.

This invention has reference to controlling devices for variable speed electric motors, and its object is to provide a controlling device of simpler form than customary and of improved construction with respect to the assemblage of parts, whereby the service rendered by the controlling device is superior and maintenance requirements are greatly reduced.

In my application No. 801,835 for controlling mechanism for alternating machines, filed Nov. 19, 1913, there is shown a controller mechanism designed for starting and protecting alternating current motors. The present invention differs from the said controlling mechanism for alternating machines and from other mechanisms employed for a similar purpose mainly in the type of element employed to accomplish speed regulation of the motor controlled. The nature of the element thus employed makes it possible to combine it with very simple mechanical means, whereby it may cover a wide scope of action, and, moreover, the system of wiring necessary in its installation is materially simplified.

The invention comprises essentially compensating or inductance coils employed in connection with a variable magnetic circuit with the coils connected in the secondary circuit of the motor to be controlled. In addition to this, there is provided a double-throw line or primary switch, whereby the primary winding of the motor may be connected in either direction to line for the running of the motor in opposite directions of rotation. In addition to these features there are provided mechanical means for operating the magnetic circuit and the line switch in proper sequence, while the working range is broadened by including a short-circuiting switch in the secondary circuit of the motor, the function of which last-named switch is to complete the secondary circuit of the motor to make it independent of the compensating coils, this being done by short circuiting the secondary leads around the compensating coils.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications come within the scope of the appended claims.

Figure 2:
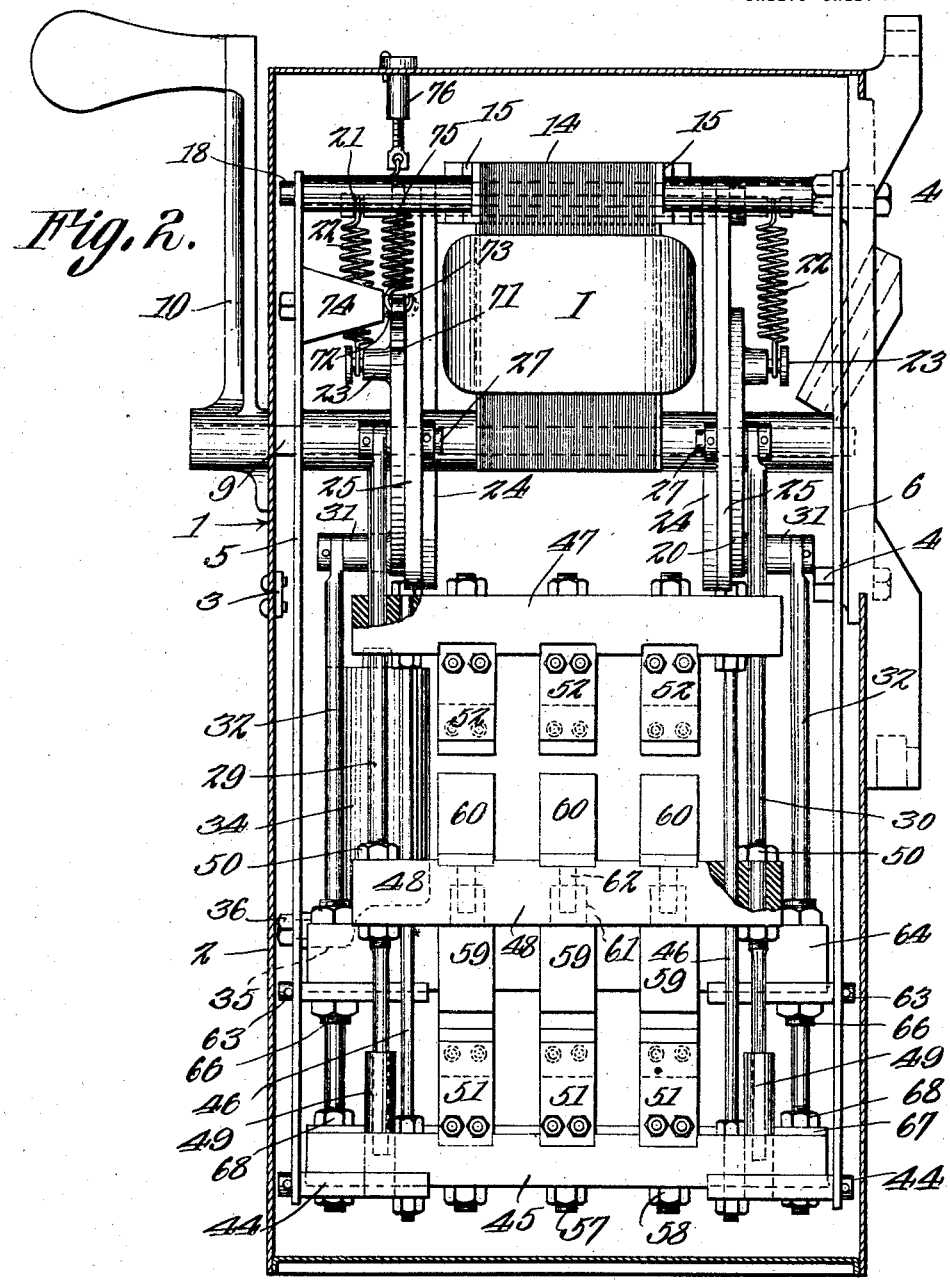
Figure 3:
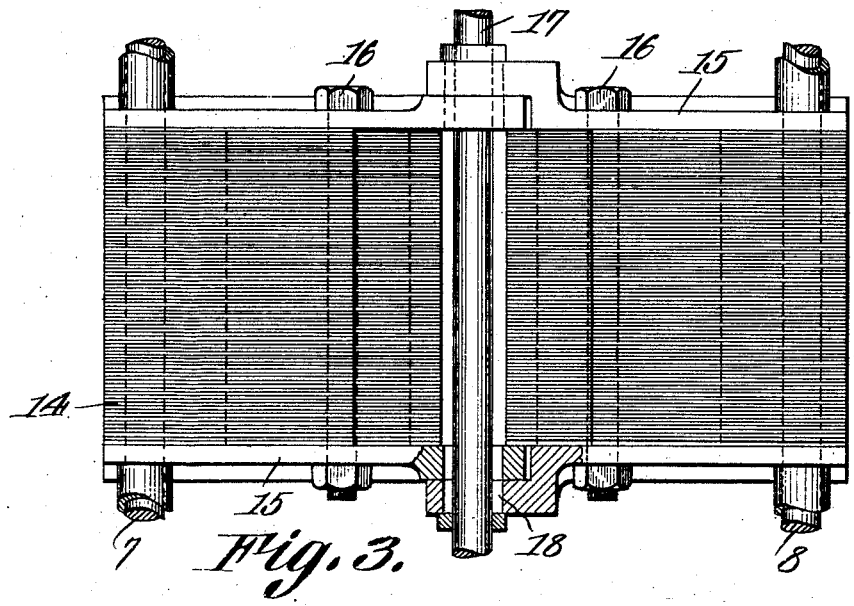
Figure 4:
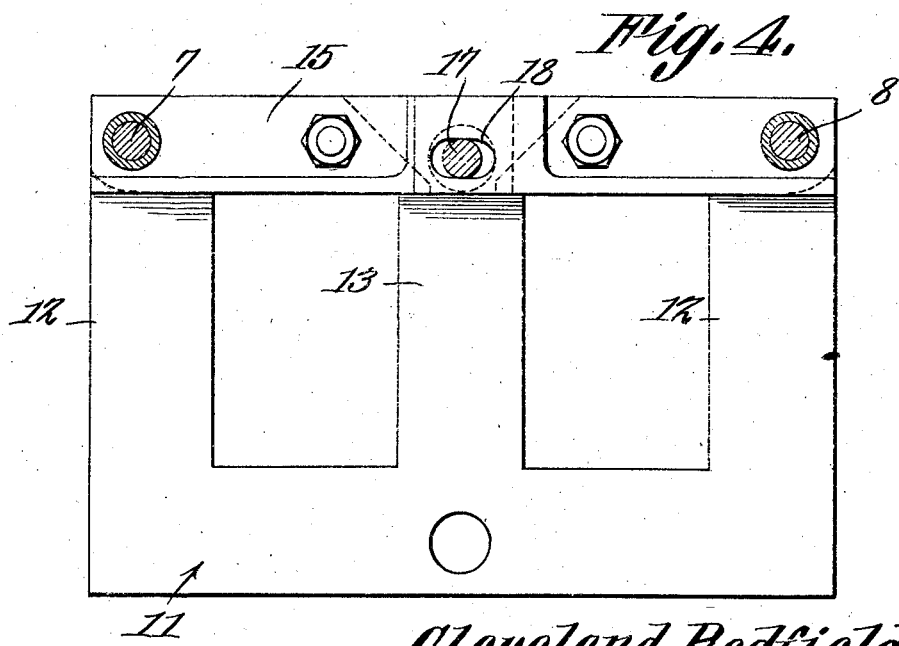

In the drawings:—Figure 1 is a front elevation of a device embodying the present invention with the casing in cross-section and the front plate of the supporting framework within the casing removed, and also with some parts broken away and in section. Fig. 2 is an elevation with some parts broken away and in section of the structure shown in Fig. 1, the casing being shown in section to expose the interior parts to view. Fig. 3 is a detail plan view of the core structure of the compensating element with the coils omitted. Fig. 4 is an elevation with some parts in section of the structure of Fig. 3. Fig. 5 is a detail sectional view of a dash pot structure employed in connection with the remainder of the device. Fig. 6 is a detail cross-section of the switch structure showing the parts in the open circuit position. Fig. 7 is a diagram of the electrical connections of the controller as applied to an electric motor.

In order to present a comprehensive view of the present invention, and before describing in detail the devices making up the controller structure, reference is had to Fig. 7 in which there is indicated a three-phase variable speed motor A with field coils B and an armature indicated by collector rings C. While a three-phase motor is shown in the drawings, it will be understood that the invention is applicable to the control of two-phase motors, and as the changes in circuit connections are obvious to any one skilled in this art it is not deemed necessary to show the application of the invention to two-phase motors. The field B of the motor A is connected by leads D to a double-throw reversing switch E, in turn connected to line conductors F. The armature collector rings C are connected by conductors G to a short-circuiting switch H and in series with the armature rings C by way of the conductors G are compensating coils I mounted on a core structure K having means hereinafter described for varying the magnetic circuit of the core structure.

If, now, the first active movement of the switch E be to close the upper contacts as located in Fig. 7, onto the intermediate contacts, the circuit is established in a certain direction through the field B. The switch H at this time being open the secondary or armature circuit is completed through the compensating coils I, which are permanently connected across the secondary leads G. These connections remain electrically unchanged until just before the final running position is reached, in which case the switch H is closed and the compensating coils are thereby shirt-circuited and rendered ineffective and the armature or secondary of the motor is also short circuited through the switch H. In returning the parts to the off position the switch H is first opened and the other connections remain unchanged until the latter part of the off movement, when the connections first established in the switch E are separated. If the middle contacts of the switch E as viewed in Fig. 7 be coupled to the lower contacts, then the connections from the line wires F to the field B through the line wires D is reversed with respect to the connections first established, and the motor is reversed in its direction of movement, the sequence of operations with respect to the coils I and switch H being the same as before.

By the use and manipulation of means for varying the magnetic reluctance of the cores of the compensating coils I, variations in speed of the motor are obtainable, but the means whereby this is brought about will be explained in connection with the more detailed explanation of the structure embodying the present invention.

Referring now to Figs. 1 to 6, the controller structure is there shown in commercially condensed form. There is provided a casing 1 having a lower portion 2 connected to the upper portion by couplings 3, it being understood that when the controller is in its installed position the casing 1, which is usually of elongated rectangular or similar form, is set with its longitudinal center line upright, and all expressions of position with respect to parts included in the controller structure have reference to the installed position of such structure. Housed in the casing 1 and made fast thereto in any appropriate manner, as by bolts 4 or otherwise, are the front and back plates 5, 6, respectively, of a suitable frame connected together and spaced apart by any suitable means. Certain of the connecting means for the front and back plates are utilized for other purposes and reference will be had particularly to such connecting means. At the top of the frame including the plates 5 and 6, and which may be termed the supporting frame for the mechanism, are rods 7, 8, respectively, these rods constituting hinge rods for certain structures. Near the top of the supporting frame but lower than the hinge rods 7 the frame is traversed by a rock shaft 9 journaled in the front and back plates and extending through the corresponding portion of the casing 1 to the exterior thereof where a crank handle 10 is applied to the shaft for imparting to the said shaft such rocking movements as may be needed.

The shaft 9 and rods or bolts 7 constitute supports for a magnetic core structure 11 having in the particular instance shown three legs 12, 13 for the compensating coils I referred to with respect to the diagram of Fig. 7.

Hinged to the upper ends of the legs 12 by the bolts 7 are movable bridging core members 14, which like the main body of the core are of laminated construction, and the laminæ of the members 14 are clamped between nonmagnetic cheek plates 15 by means of bolts 16. The cheek plates overlap at their meeting ends and are there traversed by a rod 17, the cheek plates being suitably slotted, as shown at 18, to permit the movable core members to be rocked about the hinge bolts 7 by a common actuating member represented by the rod 17. By this means the magnetic circuit may be caused to have increasing magnetic reluctance by a movement of the core members 14 about the pivot rods 7 away from the main body of the core and from each other at their meeting ends, such movement producing an increasing air gap.

Mounted on the shaft 9, which may be appropriately squared or otherwise formed for the purpose, are disks 19, 20, respectively, said disks being arranged on opposite sides of the magnetic core 11. The rod 17 has opposite ends beyond the cheek plates 15 formed with grooves 21 or otherwise constructed for the reception of the corresponding ends of springs 22, the other ends of these springs being applied to studs 23 on the respective disks 19 and 20. The studs are located above the shaft 9 and ordinarily directly over the shaft eccentric to the axis of the disks 19 and 20, so that these springs being always under some tension tend at all times to maintain the disks 19 and 20 in a certain predetermined position and to return the disks to such position when they have been moved therefrom and released to the action of the springs.

The rod 17 carries at respectively opposite ends links 24, 25, each link 24 extending to one side of the axis of the shaft 9 and each link 25 extending to the opposite side of such axis. There is thus provided a pair of divergent links at each end of the rod 17. On diametrically opposite sides of each disk 19 and 20 are recessed pins 26, 27, respectively, traversing the respective disks 19 and 20, so as to project from opposite faces thereof. The pins 26 on what may be termed the inner faces of the disks 19 and 20 carry the links 24 and 25, while on the outer face of the disk 19 the pin 26 carries a rod 28 and the two pins 27 on the outer faces of the disks 19 and 20 carry respective rods 29, 30.

The disks 19 and 20 at points intermediate of the pins 26 and 27 and below the shaft 9 are provided with outstanding studs 31 to which are pivoted the upper ends of rods 32. The links 24 and 25 where traversed by the pins 26 and 27 have elongated slots 33 through them so disposed with relation to the pins 26 and 27 that the disks 19 and 20 may have a limited degree of rotative movement before engaging either link 24 or 25, and when this limited rotation is accomplished one or the other of the pins reaches the end of the slot and causes a movement of the link so engaged with it through the remainder of the movement of the disk in the same direction. The slots 33 are made long enough so that but one pin 26 or 27 is active to the links 24 or 25 at any one time.

The rod 28 extends axially through a cylinder 34 standing substantially upright in the casing 1 and provided at its lower end with a stud 35 by which it is pivotally mounted on the plate 5 of the supporting frame by a screw 36 or otherwise. The cylinder 34 has heads 37, 38 traversed axially by the rod 28 and the head 37 may be screwed into the cylinder 34 to facilitate its removal when desired. The heads 37 and 38 carry gravity valve plates 39 permitted to have limited movement toward and from the respective heads by headed pins 40 traversing the valve plates. The heads 37 and 38 are provided with suitable ports 41. Within the cylinder 34 and secured to the rod 28 is a piston 42, while intermediate of the length of the cylinder 34 it is provided with a port 43 through its wall.

In the normal position of the parts the piston 42 covers the port 43, but on the movement of the rod 28 in either direction the piston 42 moves with it away from the port 43 causing the valve 39 then in front of the piston to close, while free access to the interior of the cylinder on the other side of the piston is provided by the port 43. In this way the structure provides a double-acting dash pot responding to movements of the disks 19 and 20 in either direction and slowing up such movements to the desired degree, wherefore the disks 19 and 20 and parts controlled thereby can be moved in the ordinary operation of the structure at but a relatively slow speed.

Mounted in the lower portion of the supporting frame by trunnions 44 journaled in the plates 5 and 6 is a bar 45 of insulating material having secured to it near its ends the lower ends of bolts 46, which at their upper ends are secured to another insulating bar 47 located at a point somewhat lower than the division line between the upper and lower members of the casing 1. There is also provided another bar 48 of insulating material located between the bars 45 and 47 and traversed by the bolts 46, but not connected to these bolts. The bolts 46 are, however, fixedly connected to both bars 45 and 47 to maintain them in spaced relation.

The rods 30 which are pivotally connected to the pins 27 extend freely but snugly through the bars 47 and slide in upright guides 49 carried by the bars 45. The rods 30 also traverse the respectively opposite ends of the bars 48 and are secured thereto by clamp nuts 50 so that the bar 48 participates in any movements of the rods.

Carried by the bars 45 is a series of contact members 51 and the bar 47 carries a similar series of contact members 52. The contact members 51 and 52 may be of any appropriate shape, but as shown comprise opposed springs 53 with terminal contact blocks 54 at their free ends and back stops 55, which latter may have some degree of elasticity. The opposed springs 53 of each contact member 51 and 52 is carried by a block 56 on a stem 57 traversing the bar 45 or 47, as the case may be, and held thereto by a nut 58 threaded on to the stem.

The bar 48 carries opposed contact fingers 59, 60, respectively, adapted to enter between the contact blocks 54 of the respective contact members 51 and 52. Since the fingers 59 and 60 are connected up to the same conductors, they may be considered as connected up in pairs through the bar 48 and in such case the finger 59 may be provided with a socket 61 into which a stem 62 of the corresponding finger 60 is threaded. The fingers 59 and 60 are so related to the contacts 51 and 52 that when the bar 48 is centralized with relation to the bars 45 and 47, the fingers 59 and 60 are out of engagement with the corresponding contacts, but a movement of the bar 48 toward the bar 45 will bring the fingers 59 into engagement with the contacts 51 and away from the contacts 52, while the reverse direction of movement brings the fingers 60 into engagement with the contacts 52 and away from the contacts 51.

The bars 45, 47 and 48 with the contacts 51, 52, 59 and 60 constitute the switch E of Fig. 7.

Secured to the plates 5 and 6 near their lower ends and to one side of the bar 48 by trunnions 63, is another insulating bar 64 similar to the bar 45. Near the ends the bar 64 is provided with guide sleeves 66 through which the rods 32 pass, and these rods extend below the bar 64 for an appropriate distance and there carry another bar 67 of insulating material adjacent to the bar 45, the rod 32 being made fast to the bar 67 by nuts 68 or otherwise. The bar 64 carries a series of contacts 69 similar in structure to the contacts 51 and 52 and in the detailed showing of the parts the same reference numerals are applied to the contacts 69 as are applied to the contacts 51 and 52. The bar 67 carries contact fingers 70 like the fingers 59 or 60 and designed to enter between the contact blocks 54 of the contacts 69.

The disk 19 has along its upper edge a peripheral series of notches 71 designed to receive a roller 72 on one end of a pivoted dog 73 carried by a block 74 secured to the face plate 5. The other end of the dog 73 is engaged by one end of a spring 75, the other end of which spring is made fast to an adjusting screw 76, in turn carried by the casing 1, so that the tension of the spring 75 may be adjusted at will.

It may be assumed that the contacts 52 represent the upper contacts of the switch E of Fig. 7, in which case the lower contacts 51 will represent the lower contacts of the switch E of Fig. 7, and the contacts 59 and 60 together represent the intermediate contacts of the switch E of Fig. 7, while the contacts 69 and 70 represent the contacts of the switch H, and in such case the fingers 70 are all electrically connected together.

With the structure of Fig. 1 and associated figures the parts are shown in the open circuit position. If, now, the crank arm 10 be moved toward the left as seen in Fig. 1, the disks 19 and 20 are rocked counterclockwise, thus lifting the rods 29, 30. The movement described progresses slowly, because as soon as the crank arm is moved the dash pot represented by the cylinder 34 comes into action and quick movements of the crank arm are resisted. The lost motion movement of the pins 27, which under the conditions assumed are rising as viewed in Fig. 1, is sufficient to close the fingers 60 on to the contact blocks 54, thus completing the motor circuit. However, while the pins 31 are traveling with the disks 19 and 20 the movement of the rods 32 is not yet sufficient to bring the contact fingers 70 into engagement with the contacts 69, and the closure of the circuit between the contacts 69 and 70 does not occur until after the pins 27 have come to the ends of the slots 33 in the links 25, and these links have been moved sufficiently to rock the core sections 14 to introduce reluctance into the magnetic circuit. When the contacts 52 and 60 are in engagement and before the movable core members 14 have been rocked to produce an increasing magnetic reluctance, the movement of the crank arm 10 may be stopped, the parts being held in the position to which they are adjusted by the detent block 73 engaging in one of the notches 71. Under these circumstances the motor will run at its minimum speed. Upon further movement of the crank 10 in the direction stated progressively widening air gaps occur in the magnetic core between the leg 13 and the movable core sections 14, whereby the desired acceleration in speed of the motor is obtained by augmenting the current in the secondary winding thereof. By a still further movement of the crank 10 the short-circuiting switch contacts 69 and 70 are brought together, whereby the coils I being short circuited are electrically eliminated from the secondary circuit of the motor, thus providing a direct path for the secondary current giving to the motor its maximum speed. When it is desired to stop the motor the movement of the cranking handle is reversed from the running position and the connections are established in the reverse order to the starting connections. When it is desired to reverse the direction of rotation of the motor from that first considered, it is simply necessary to move the crank 10 in a clockwise direction as viewed in Fig. 1, when the starting and running connections are established in the same manner as before but with the field connections of the motor reversed. When the controller is in the installed position the lower member of the casing 1 contains sufficient oil to immerse all the switch terminals so as to eliminate sparking.

What is claimed is:—

1. A controlling device for variable speed electric motors, comprising a main switch for coupling the primary of the motor to line, an inductance means with a variable magnetic circuit adapted to be connected in the secondary circuit of the motor, and means for increasing the magnetic reluctance of the magnetic circuit and ultimately short-circuiting the inductance means and the secondary of the motor to cause acceleration of the speed of the motor up to maximum.

2. A controlling device for variable speed electric motors, comprising a main switch for coupling the primary of the motor to line, an inductance means with a variable magnetic circuit adapted to be connected in the secondary circuit of the motor, and means for increasing the magnetic reluctance of the magnetic circuit and ultimately short-circuiting the inductance means and the secondary of the motor to cause acceleration of the speed of the motor up to maximum, said controller having means for arresting the adjustment of the reluctance of the variable magnetic circuit to hold the motor at intermediate speeds, at will.

3. A controlling device for variable speed electric motors, comprising a main switch for coupling the primary or field winding of the motor to line, inductance coils adapted to be included in the secondary or armature of the motor and provided with a closed magnetic circuit, means for varying the reluctance of the magnetic circuit, and means for short-circuiting the armature leads and thereby electrically cutting out the inductance coils on the attainment of the maximum magnetic reluctance of the magnetic circuit, to thereby cause the attainment of the maximum speed of the motor.

4. A controlling device for variable speed electric motors, comprising inductance means having inductance coils and a variable magnetic circuit therefor with the coils adapted to be connected in circuit with the armature winding of the motor, a switch for connecting the motor to line, and means for varying the reluctance of the magnetic circuit to affect speed regulation of the motor.

5. A controlling device for variable speed electric motors, comprising a switch for connecting the field winding of the motor to the line, compensating coils and a variable magnetic circuit therefor with the coils connected together at one end and with the other end of the coils connected to the terminals of the armature winding of the motor, and means for varying the magnetic circuit of the compensating coils to vary the speed of the motor.

6. A controlling device for variable speed electric motors, comprising a switch for connecting the field winding of the motor to the line, compensating coils and a variable magnetic circuit therefor with the coils connected together at one end and with the other end of the coils connected to the terminals of the armature winding of the motor, and means for varying the magnetic circuit of the compensating coils to vary the speed of the motor, the controlling device also including a secondary switch having terminals all connected together and other terminals connected to the respective compensating coil leads, and means for closing the secondary switch to short circuit the compensating coils and the secondary winding of the motor.

7. A controlling device for variable speed electric motors, comprising compensating coils and a variable magnetic circuit therein with one end of all of the coils connected together and the other end of the coils connected to respective leads of the secondary winding of the motor, a primary or line switch for connecting the motor to the line, a secondary switch having the terminals on one side all connected together and the terminals on the other side connected across the compensating coil leads, and mechanical means connected to the line switch for controlling it, to the magnetic circuit of the compensating coils for varying the reluctance of said magnetic circuit, and to the secondary switch for short circuiting the terminals of the secondary winding of the motor and electrically cutting out the compensating coils.

8. A controlling device for variable speed electric motors, comprising an inductive element consisting of coils and a variable magnetic circuit with the coils connected to the secondary circuit of the motor, a primary switch to connect the motor to line, a secondary switch to short circuit the secondary winding of the motor, mechanical means for closing the primary switch, varying said magnetic circuit, and closing the secondary switch in the order named, and a retaining device for maintaining the apparatus in the final or in different intermediate running positions or in the off position.

9. A controlling device for variable speed electric motors, comprising a coil with a magnetic circuit having parts relatively movable, a primary switch, a secondary switch, a shaft, an operating handle for the shaft, a disk mounted on the shaft, connections between the disk and the primary and secondary switches for opening and closing the latter, connections from the disk to the magnetic circuit for controlling said circuit, a detent lever having a roller at one end and the disk being provided with notches to receive the roller to hold the apparatus in any desired active position or in the off position, and a dash pot connected to the shaft for retarding rotation of the shaft in its movement from the off position.

10. A controlling device for variable speed electric motors, comprising coils and a variable magnetic circuit therefor closed in the position of the parts for starting the motor, with the coils adapted to be connected into the secondary circuit of the motor, switch means for connecting the motor to line for the operation of the motor in opposite directions of rotation, and means for varying the magnetic circuit on coupling the motor to line for rotation in either direction.

11. A controlling device for variable speed electric motors, comprising coils and a variable magnetic circuit therefor closed when in starting position, with the coils connected in the secondary circuit of the motor, switch means for connecting the motor to line for operation in opposite directions of rotation, and a mechanical means for closing the line switch in either direction and thereafter varying the magnetic circuit.

12. A controlling device for variable speed electric motors, comprising coils and a variable magnetic circuit therefor closed when in starting position with the coils connected in the secondary circuit of the motor, switch means for connecting the motor to line for operation in opposite directions of rotation, and a mechanical means for closing the line switch in either direction and thereafter varying the magnetic circuit, said controlling device being also provided with a retarding means for controlling the time taken in varying the magnetic circuit, and a detent for maintaining the apparatus in any of several running positions or in the off position.

13. A controlling device for variable speed electric motors, comprising compensating coils, a magnetic circuit therefor comprising a fixed and a movable part, two primary switches for connecting the motor to the line for its operation in opposite directions, a secondary switch for short circuiting the secondary winding of the motor and simultaneously cutting out the compensating coils to give to the motor its maximum speed, a shaft and operating handle therefor, mechanism means connecting the shaft with the switches and the movable part of the magnetic circuit to close one of the primary switches by a movement of the handle in one direction and then actuate the movable part of the magnetic circuit and finally to close the secondary switch in the order named on the movement of the handle in either direction, and a detent to maintain the apparatus in the off position or in any desired running position in either direction of movement of the handle.

14. A controlling device for variable speed electric motors, comprising compensating coils provided with a magnetic circuit having fixed and movable parts, spring means tending to hold the magnetic circuit closed, a shaft and operating handle therefor with the shaft passing through the fixed part of the magnetic circuit and carrying at each side thereof a flange permanently fixed to the shaft, links each pivoted at one end to a movable part of the magnetic circuit and at the other end connected to a respective disk by a pin and slot connection, rods pivoted at one end to the disks, insulating bars connected to the rods and carrying contacts of the primary switch, other rods similarly connected to the disks and carrying contacts of a secondary switch, a detent for engaging one of the disks with said disk notched for the detent, adjustable spring means for the detent, and other spring means for centralizing the disks and parts controlled thereby to the off position of the controller.

In testimony, that I claim the foregoing as my own, I have hereunto affixed my signature in the presence of two witnesses.

CLEVELAND REDFIELD.

Witnesses:
  ROBERT G. AGEE,
  LILLIAN THOMAS.